US006984071B2

(12) United States Patent
Landrieve (10) Patent No.: US 6,984,071 B2
(45) Date of Patent: Jan. 10, 2006

(54) INSTRUMENTED ANTIFRICTION BEARING FOR CONTROL WHEEL

(75) Inventor: Franck Landrieve, Fondettes (FR)

(73) Assignee: SKF France, Montigny le Bretonneux (FR)

( * ) Notice: Subject to any disclaimer, the term of this patent is extended or adjusted under 35 U.S.C. 154(b) by 30 days.

(21) Appl. No.: 10/297,716

(22) PCT Filed: Jun. 1, 2001

(86) PCT No.: PCT/FR01/01702

§ 371 (c)(1),
(2), (4) Date: Sep. 22, 2003

(87) PCT Pub. No.: WO01/94800

PCT Pub. Date: Dec. 13, 2001

(65) Prior Publication Data

US 2004/0052439 A1    Mar. 18, 2004

(30) Foreign Application Priority Data

Jun. 7, 2000   (FR) .................................. 00 07297

(51) Int. Cl.
*F16C 19/52* (2006.01)
(52) U.S. Cl. .................................................. 384/448
(58) Field of Classification Search ................ 384/448, 384/446; 324/207.25, 207.15, 173, 174; 73/862.192
See application file for complete search history.

(56) References Cited

U.S. PATENT DOCUMENTS

| 5,002,404 A | * | 3/1991 | Zernickel et al. ............ 384/448 |
| 6,113,276 A | * | 9/2000 | Bourgeois-Jacquet ....... 384/448 |
| 6,742,402 B1 | * | 6/2004 | Volz et al. .............. 73/862.192 |

FOREIGN PATENT DOCUMENTS

| DE | 25 01 521 | 7/1976 |
| DE | 37 25 972 A1 | 2/1989 |
| DE | 195 10 717 | 9/1996 |
| DE | 196 34 102 | 12/1997 |
| EP | 0 983 924 A1 | 3/2000 |
| FR | 648646 | 12/1928 |
| FR | 1 115 180 | 4/1956 |
| FR | 2 782 970 | 3/2000 |
| GB | 183 660 | 8/1922 |

\* cited by examiner

*Primary Examiner*—Thomas R. Hannon
(74) *Attorney, Agent, or Firm*—Young & Thompson (57) ABSTRACT

An instrumented antifriction bearing, for control wheel, includes an outer part (1), an inner part (8), one rotating and the other non-rotating, a row of rolling elements (12) arranged between the rotating and non-rotating parts, and elements for detecting rotation parameters. The rotating part is provided at one of its axial ends with elements for fixing and angularly linking the rotating part on a control wheel, the non-rotating part comprising a radial surface (3a) provided with elements for being fixed on a support.

13 Claims, 6 Drawing Sheets

INSTRUMENTED ANTIFRICTION BEARING FOR CONTROL WHEEL

CROSS REFERENCE TO RELATED APPLICATION

This is the 35 USC 371 national stage of international application PCT/FR01/01702 filed on Jun. 1, 2001 which designated the United States of America.

FIELD OF THE INVENTION

The present invention relates to the field of instrumented assemblies of the type for control or operating wheels used for example to steer motor vehicles, handling vehicles or civil engineering works vehicles or any other type of vehicle or machine requiring a steering wheel.

BACKGROUND OF THE INVENTION

In the conventional way, a control wheel is connected to a shaft, for example a steering column shaft, which, depending on the type of steering used, either directly turns the steering mechanism in the case of mechanical steering, actuates hydraulic pressure distributors in the case of hydraulic steering or, finally, in the case of electric steering, actuates the encoder ring of a sensor device delivering a signal to the electric control motor, various combinations of these types being possible.

In the case of purely electrical steering, which is increasingly commonly in use on handling vehicles such as forklift trucks. A system detecting the rotation of the wheel, which may or may not be incorporated into bearings, delivers, via a cable, a signal representative of the turning of the wheel to the device for steering the wheels of the vehicle. As the wheel is mounted on its support by one or more antifriction bearings and is not connected to mechanical torque-transmitting systems, the wheel can be turned with an extremely low resistive torque. Often added to this is a wheel-braking system intended to generate therein a resistive torque so as to encourage precision and driveability in the driving of the vehicle. A device of this type is described for example in document DE-A-195 10 717.

This device does, however, exhibit certain disadvantages among which we shall take note first of all of the relatively great axial bulk and the relatively high cost which are due to the presence of two antifriction bearings in the continuation of which is arranged a braking system employing a coil spring which presses a conical friction piece into a cup which also has a conical friction surface. The frictional torque developed by such a device is relatively low and the wear high because of the small friction surfaces. Furthermore, the braking system alters the operating play in the bearings.

Document FR-A-2 782 970 discloses a control wheel mounted on an instrumented antifriction bearing and to which is added a braking system the rotating part of which is supported by the rotating inner ring of the antifriction bearing and rubs against the end wall of a housing. However, in this type of device, the antifriction bearing is not mounted on a shaft and the diametral bulk of the bearing and of the device is great. In addition, the wheel comprises a radial part and an axial part for fixing it to the antifriction bearing. The wheel therefore has a high axial bulk.

SUMMARY OF THE INVENTION

The invention proposes to overcome the disadvantages of the devices of the prior art.

The invention proposes an economical and radially unbulky device.

The instrumental antifriction bearing device, according to one aspect of the invention, is of the type for a control wheel, comprising an outer part, an inner part, one being rotating and the other non-rotating, a row of rolling elements arranged between said rotating and non-rotating parts. Said device further comprises a means of detecting rotating parameters. The rotating part is provided at one of its axial ends with means for fixing and angularly connecting said rotating part to an operating wheel, the non-rotating part comprising a radial surface provided with means of attachment to a support.

In one embodiment, the means of attaching the operating wheel to the rotating part are formed from a roughly radial surface of the rotating part.

As a preference, the means of securing the non-rotating part are arranged radially a distance away from the axis of rotation of the rotating part that is greater than or roughly equal to the distance between the means of attachment of the radial surface of the rotating part and the axis of rotation.

The means of attachment of the rotating part do not impede access to the region of the axis of rotation of the rotating part, whether the non-rotating part be the outer part or the inner part of the braked antifriction bearing. The means of attachment of the non-rotating part also make it possible for the instrumented antifriction bearing to be mounted easily on a support wall, possibly incorporating the instrumented antifriction bearing in a housing of the support wall so that the instrumented antifriction bearing lies in its entirety on one first side of the support wall to which it is fixed, whereas as the control member associated with the braked antifriction bearing is situated axially on the opposite side.

In one embodiment, the rotating part comprises an axial portion provided with a radial surface in which at least one fixing hole is made.

In one embodiment, the rotating part comprises a tubular portion and a radial portion extending radially inward from one end of the tubular portion, the radial portion being provided with at least one fixing hole.

In one embodiment, the rotating part comprises a tubular portion and a radial portion extending radially outward from one end of the tubular portion, the radial portion being provided with at least one fixing hole.

Possibly, the non-rotating part comprises a tubular portion, a radial portion extending radially outward from one end of the tubular portion, the radial portion being provided with at least one fixing hole.

Advantageously, the radial portion of the non-rotating part is situated more or less in the same radial plane as the radial surface of the rotating part.

Preferably, the non-rotating part comprises an open center hole allowing the passage of a shaft.

Advantageously, the rotating and non-rotating parts each comprise a raceway between which the rolling elements are arranged.

In one embodiment, the rotating and non-rotating parts each comprise a ring between which the rolling elements are arranged.

In one embodiment, the device comprises braking means comprising a plurality of disks held in frictional contact by at least one axially elastic element.

In one embodiment, the device comprises braking means comprising a gasket in frictional contact with a cylindrical surface of the rotating part.

This instrumented bearing device can be fitted and mounted easily at numerous possible locations on a vehicle or a machine, for example on a dashboard, via the housing which acts as support. Just a few screws are needed to fix the device and allow it to be turned by the operating or control wheel. The means of securing the non-rotating part are judiciously placed in order not to impede access to the region of the axis of rotation of the rotating part and so as to allow the antifriction bearing to be incorporated into a dashboard for example.

BRIEF DESCRIPTION OF THE DRAWINGS

The present invention will be better understood and other advantages will become apparent from reading the detailed description of a few embodiments taken by way of entirely nonlimiting examples and illustrated by the appended drawings, in which.

DETAILED DESCRIPTION OF THE INVENTION

Figure 1:
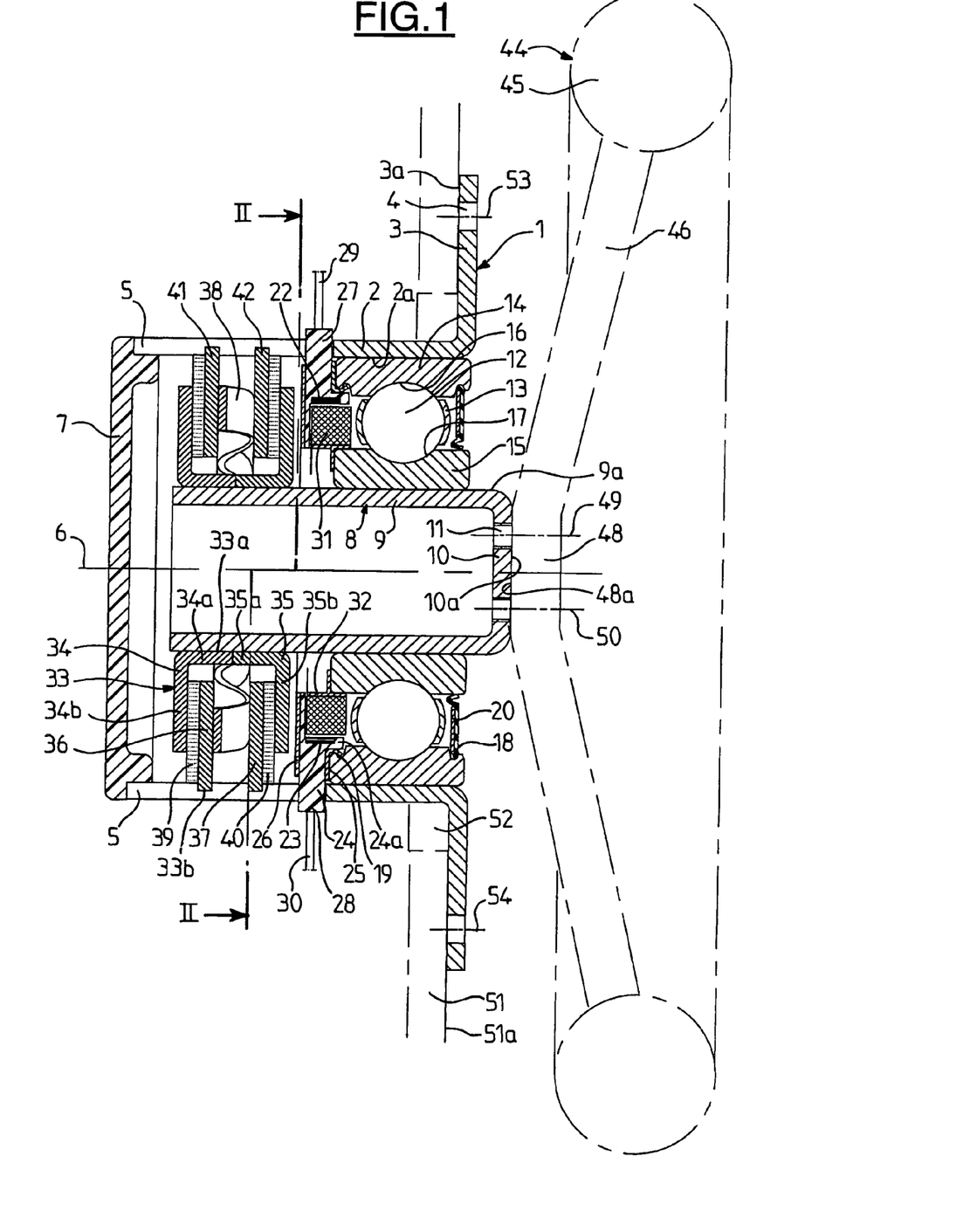
FIG. 1 is a view in axial section of a bearing device.
Figure 2:
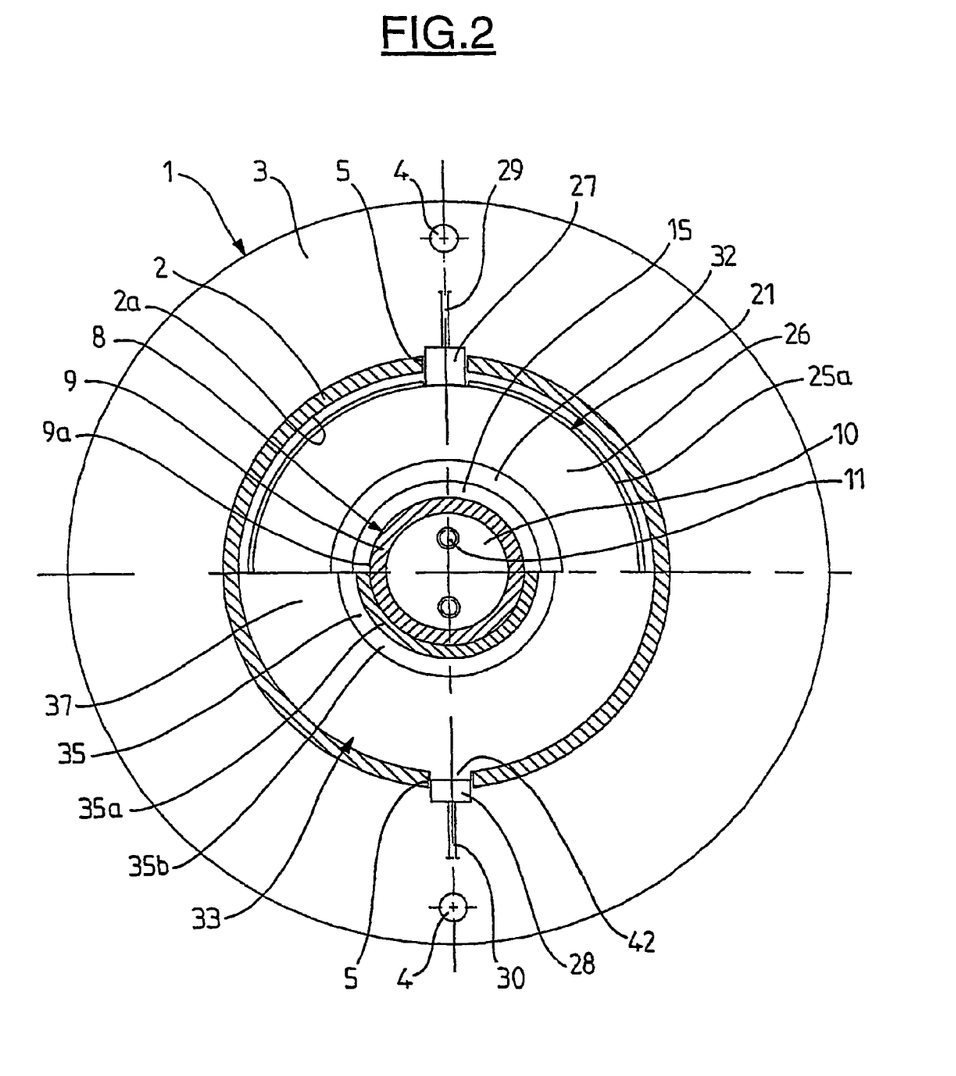
FIG. 2 is a section on II—II of FIG. 1 of the bearing device.

As can be seen in FIGS. 1 and 2, the antifriction bearing device comprises an outer element 1, of annular shape, with an L-shaped half section, with a tubular portion 2 and a radial portion 3 extending at one end of the tubular portion outward. The radial portion 3 comprises a surface 3a directed on the side of the tubular portion 2 and provided with a plurality of fixing holes 4 passing through the wall 3 and able to take screws with a view to fixing to a fixed structure. The tubular portion 2 is provided with two notches forming slots 5 extending from the free end of said tubular portion 2 and situated opposite the radial portion 3. The slots 5 are of rectangular shape, their length running parallel to the axis referenced 6, which is the axis of rotation of the rotating part, on which the outer element 1 is centered. The outer element 1 may be made of pressed or bent sheet metal. A cap 7, produced for example in a synthetic material, with the shape of a disk, closes the free end of the tubular portion 2 on which the slots 5 open, being push-fitted into its bore.

The antifriction bearing device also comprises an inner element 8, also centered on the axis 6, of annular shape and U-shaped section, having a tubular portion 9 one end of which is closed off by a radial portion 10 running radially inward from one end of the tubular portion 9. A plurality of holes 11 are provided through the radial portion 10 to take screws, for example intended for fixing an operating wheel. The inner element 8 may also be made of pressed sheet metal. Between the outer 1 and inner 8 elements there is a row of rolling elements 12 which are held by a cage 13.

An outer ring 14 is push-fitted into the bore 2a of the tubular portion 2 of the outer element 1 and is provided with a raceway 16 for the rolling elements 12. An inner ring 15 is push-fitted onto the outer surface 9a of the tubular portion 9 of the inner element 8 and provided with a raceway 17 for the rolling elements 12. The outer ring 14 is also provided with two symmetric annular grooves 18 and 19 formed on its bore, one on each side of the raceway 16. Fixed in the groove 18 is a sealing member 20 which rubs against a bearing surface of the inner ring 15. Fixed in the groove 19 is a sensor unit referenced 21 in its entirety.

In the example illustrated, the sensor unit 21 comprises two detection elements 22, 23 arranged diametrically opposed and each embedded in a synthetic material forming a central part 24 of the sensor unit 21. The sensor unit 21 is fixed on the frontal face of the outer ring 14 by means of a fixing support 25 inserted between the ring 14 and the sensor unit 21, both on the radial parts and on the circumferential parts and a free end of which is bent into the groove 19.

A cylindrical annular portion 24a is inserted partially into the bore of the non-rotating ring 14 more or less in the region of the groove 19, so that the detection elements 22, 23 can be arranged partly between the two rings 14 and 15. An external protective plate 26 is also fixed to the outside of the sensor unit 21 by crimping performed by folding the other free end 25a of the support 25 onto the periphery of the external protective plate 26.

The sensor unit 21 further comprises two wire terminals 27 and 28 which are associated respectively with the detection elements 22 and 23 and formed by an outgrowth of the synthetic material of the central part 24 for fixing the end of a cable 29, 30 by means of which a signal emitted can be passed on to an electronic signal processing and operating unit, not depicted in the figures. The wire terminals 27, 28 of the sensor unit 21 each project through a slot 5 of the tubular portion 2 of the outer element 1 while being in contact with the end walls of said slots 5.

The two detection elements 22, 23 each collaborate with a single encoder ring 31 mounted facing the sensor unit 21 on the external cylindrical surface of the rotating ring 15 so as to be driven in rotation by the latter. The encoder ring 31 is mounted by means of a support 32 which is housed in part between the rings 14 and 15. The support 32, of annular shape with T-shaped cross section, is push-fitted onto the outer cylindrical surface of the rotating ring 15 and butts against a frontal surface thereof. A portion of the encoder ring 31 thus lies between the rings 14 and 15 and a portion projects outward. Most of the outer cylindrical surface of the encoder ring 31 lies facing the two detection elements 22, 23 with a small gap.

An antifriction bearing is thus formed by the rolling elements 12 and raceways made on the axial surfaces of the rings 14 and 15. One or more sealing gaskets, one or more encoders, one or more sensors, etc. may be added to this antifriction bearing.

A braking member 33 is also arranged between the outer surface 9a of the tubular portion 9 of the inner element 8 and the bore 2a of the tubular portion 2 of the outer element 1. The braking member 33 is arranged in the axial continuation of the antifriction bearing equipped with its system for detecting rotation parameters and is situated axially between the free end of the tubular portion 9 of the inner element 8 and the plate 26 protecting the sensor unit 21. More generally, the braking member 33 is bounded axially by the cap 7, because provision could be made for it to project axially beyond the free end of the tubular portion 9 toward said cap 7.

The braking member 33 comprises a rotating part 33a formed of two elements 34, 35 of similar form and each comprising a tubular axial portion 34a, 35a and a radial portion 34b, 35b in the form of a disk. The free ends of the tubular portions 34a, 35a are mounted in contact with one another so that the elements 34 and 35 form a rotating part 33a with a U-shaped cross section push-fitted onto the outer surface 9a of the tubular portion 9.

The non-rotating part 33b of the braking member 33 comprises two metal disks 36 and 37 arranged axially between the radial portions 34b and 35b of the rotating part 33a. Arranged between the disks 36 and 37 is an axially elastic washer 38. A friction lining or disk 39 is arranged axially between the disk 36 and the disk-shaped radial portion 34b. This friction lining or disk is made of a material with a high coefficient of friction with respect to the fixed disks 41 and the radial portion 34b. In the case of a lining, it is preferably bonded to the disk 41 and rubs against the radial portion 34b. The same is true for the friction lining 40, the disk 37 and the radial portion 35b.

The disks 36 and 37 each comprise two lugs 41, 42 projecting radially outward, diametrally opposed and each one arranged in a slot 5 of the tubular portion 2 of the outer element 1.

In operation, the disks 36 and 37 are angularly secured to the outer element 1 because of the presence of the lugs 41, 42 which thus prevents any angular displacement with respect to the slots 5. The disks 36, 37 are therefore fixed while the lateral elements 34, 35 can turn. The frictional contact between the fixed disks and the rotating elements by way of the friction linings or disks 39, 40 therefore creates a resistive torque.

The elastic washer 38 permanently maintains an axial force tending to force the disks 41 and 42 apart and thus ensuring that the friction linings or disks 39 and 40 rub against the corresponding surfaces of the radial portions 34b and 35b of the rotating part 33a of the braking member 33.

In FIG. 1, a control member in the form of an operating wheel 44 comprises a toric part 45 for holding, secured to a support part 46 in the form of a cup with a radial part 47 the larger-diameter free end of which supports the part 45 for holding and a central part 48 extending radially inward from the inner edge of the radial part 47. The central part 48 has a surface 48a in contact with a surface 10a of the radial portion 10 oriented on the opposite side to the cap 7. Fasteners 49 and 50, depicted as lines to improve the clarity of the drawing, collaborate with the holes 11 of the radial wall 10 to allow the operating wheel 44 to be fixed onto the rotating inner part 8 and to drive the rotation of the rotating part 8 by the operating wheel 44. The fasteners 49 and 50 may for example be screws provided on the outer surface with a screw thread collaborating with a screw thread made on the bores of the holes 11 in the radial wall 10.

A support wall 51, extending in a radial plane, has a surface 51a oriented on the same side as the operating wheel 44, bearing against the surface 3a of the radial portion 3. The support wall 51 has an axial hole 52 allowing the tubular portion 2 of the outer element 1 to pass axially while at the same time preventing axial passage of the radial portion 3 of the outer element 1. Thus, the outer element 1 can be brought, by passing the tubular portion 2 axially through the axial hole 52 in the support wall 51, to a position where the radial surface 3a of the radial wall 3 butts against the surface 51a of the support wall 51. Fasteners 53, 54 collaborate with the fixing holes 4 in the radial surface 3a to allow the outer element 1 to be fixed to the support wall 51.

The instrumented antifriction bearing device is thus in the form of a compact cartridge arranged radially between the fixed outer element 1 and the rotating inner element 8, in the axial continuation of and in close proximity to the instrumented antifriction bearing. The means of securing the non-rotating outer element, which means are arranged on a radial surface of the radial portion 3, allow the instrumented antifriction bearing to be mounted in such a way that it lies on a first side of the support wall 51 while the wheel is situated on the opposite side, while at the same time maintaining simple mounting of the braked bearing on its support. The instrumented antifriction bearing can thus be incorporated into the support to reduce the bulk of the instrumented antifriction bearing and to afford better protection to the instrumented antifriction bearing.

The various functions, particularly the bearing function afforded by the rolling elements 12, the function of detecting rotation parameters afforded by the sensor unit 21 and the function of braking afforded by the braking member 33, are performed by means arranged in an annular space bounded radially between the tubular portion 2 of the outer element 1 and the tubular portion 9 of the outer element 8 and axially between the radial portion 34a of the element 34 of the braking element 33 and the frontal surface of the rings 14 and 15 opposite the sensor unit 21. Furthermore, the rolling elements 12, the means of detecting the parameters and the braking means are axially adjacent one to the next, which means that the braked antifriction bearing has a small axial bulk. More specifically, in this embodiment, the braking means is adjacent to the detection means, the detection means being adjacent to the rolling elements 12.

The various elements can be mounted by push-fitting the antifriction bearing and the braking member 33 onto the inner element 8 then by bringing the outer element 1 from right to left in FIG. 1, causing the outer ring 14 to be push-fitted into the bore 2a, causing the wire terminals 27 and 28 to pass into the slots 5 and the lugs 41 and 42 also to pass into the same slots 5. The cap 7 is then fixed onto the outer element 1.

It will be noted that the slots 5, of which in an alternative form there may be a number different than two, allow both the passage of the cables 28 and 29 and the angular securing of the non-rotating part 33b of the braking member 33 and of the outer element 1. The various elements are all of simple shape. The antifriction bearing may be of standard and therefore very economical type. The braking member can be manufactured from sheet metal parts which are also very economical.

Of course, it would be possible to anticipate a cartridge in which the device for detecting the rotation parameters was not mounted on the bearing rings but was mounted beside them, for example in direct contact with the inner 1 and outer 8 elements. Use of just one detection element and just one wire terminal could be anticipated.

The operating wheel 44 may be fixed easily onto the rotating inner element 8. The use of an intermediate element 8 between the instrumented antifriction bearing and the operating wheel 44 allows the operating wheel 44 and its fixing to be simplified. Thus, the operating wheel has a part 45 for holding and a radial part 47 which means that the operating wheel 44 has a very small axial bulk, making it easier to store and to transport, and allowing costs savings in the manufacture and installation of the instrumented antifriction bearing and of the operating wheel 44. In addition, there is less risk of damaging the wheel while it is being transported, because it has no projecting axial part.

Figure 3:
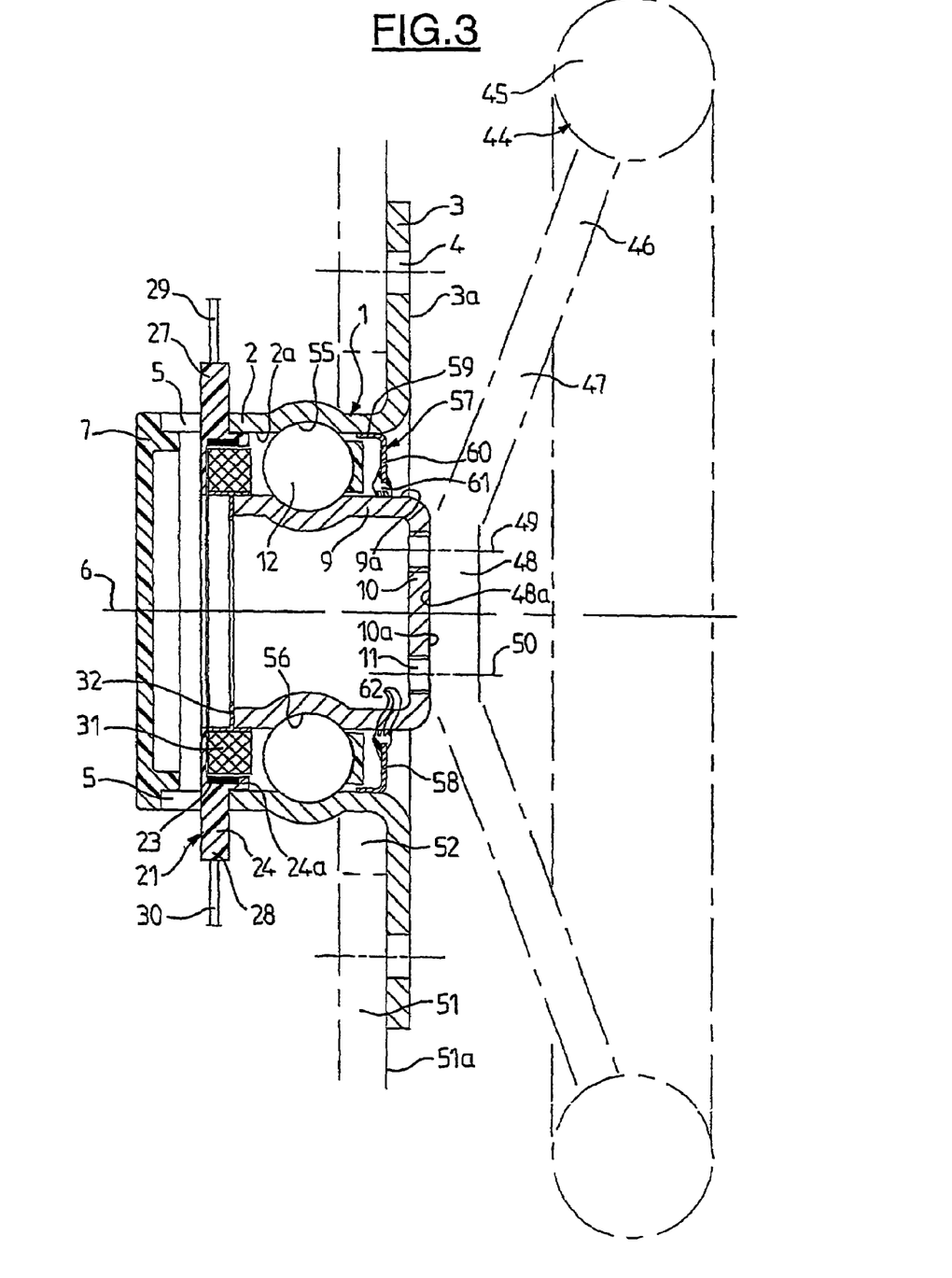
FIG. 3 is view in axial section of a second embodiment of the bearing device.

In FIG. 3, the references which relate to elements which are similar have been repeated. In this embodiment, the outer element 1 has, on the bore 2a of the tubular portion 2, a raceway 55 obtained by deforming said tubular portion 2. The outer surface 9a of the tubular portion 9 comprises a raceway 56 obtained by deforming said tubular portion 9, radially opposite the raceway 55. The rolling elements 12 are arranged directly between the raceway 55 of the outer element 1 and the raceway 56 of the inner element 8. The braked antifriction bearing is thus lighter in weight and radially more compact.

The cylindrical annular portion 24a of the sensor unit 21 is here push-fitted directly into the bore 2a of the tubular portion 2 of the outer element 1. The support 32 of the encoder ring 31 is push-fitted directly onto the outer surface 9a of the tubular portion 9, axially butting against the axial end of the tubular portion 9.

A sealing member 57 arranged radially between the tubular portion 2 of the outer element 1 and the tubular portion 9 of the inner element 8, and axially on the same side of the rolling elements 12 opposite the cap 7, has an annular metal armature 58 of L-shaped cross section. The sealing member 58 comprises an axial portion 59 push-fitted into the bore 2a of the tubular portion 2 of the outer element 1 and a radial portion 60 extending radially inward from one end of the axial portion 59 opposite the rolling elements 12. A lip seal 61, overmolded on the smallest-diameter region of the radial portion 60 of the metal armature 58, has three lips 62 coming into dynamic rubbing contact with the outer surface 9a of the tubular portion 9 of the inner element 8.

The particular structure of the braked antifriction bearing gives it a small axial bulk. The holes 4 of the radial surface 3a of the outer element 1 allow the outer element 1 to be fixed to a support wall 51. The holes 11 of the radial wall 10 of the inner element 8, which here is the rotating element, allow the securing of an operating wheel 44, and allow mutual rotational drive between the operating wheel 44 and the rotating part, in this instance the inner element 8.

The use of a sealing member 57 having a lip seal 61 in dynamic running contact with the outer wall 9a of the radial portion 9 of the inner element 8 and secured to the outer element 1 makes it possible both to seal the antifriction bearing while generating a friction force which opposes the turning of the inner element 8 in the outer element 1. The braking means, which is the sealing member 57, fixed directly onto the outer element 2, is axially adjacent to the rolling elements 12. Various arrangements of the braking means, of the detection means and of the row of rolling elements 12 may be envisioned, leaving these axial elements adjacent one to the next, so as to obtain improved axial compactness.

This particular embodiment makes it possible to obtain the braked antifriction bearing at low cost, from elements manufactured economically by cutting, pressing, rolling and heat treatment.

Figure 4:
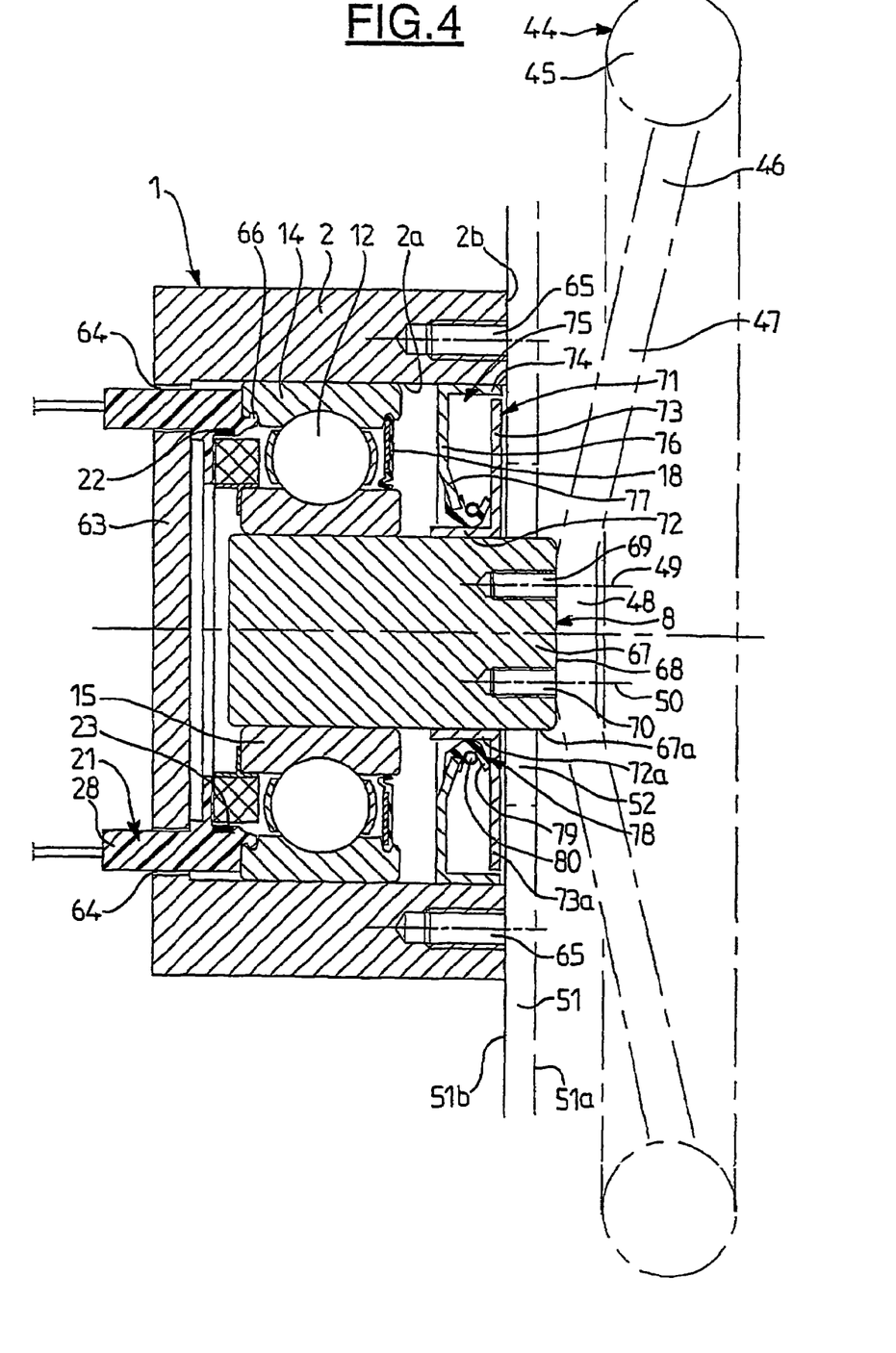
FIG. 4 is a view in axial section of a third embodiment of the bearing device.

In FIG. 4, the outer element 1 in the form of an annular cup comprises a tubular portion 2 having a bore 2a and an annular radial surface 2b situated axially on the same side of the operating wheel 44 and in contact with a surface 51b of the support wall 51 opposite the surface 51a of the support wall 51. The annular surface 2b is provided with two radially distant threaded axial holes 65. A radial portion 63 extends radially inward from the end of the tubular wall 2 opposite the annular surface 2b and axially closes the bore 2a of the tubular wall 2 while at the same time having two radially distant axial holes 64 situated axially facing the detection elements 22, 23.

The sensor unit 21 comprises an annular bulge 66 projecting into the annular groove 19 of the ring 14 so as to fix the sensor unit 21 onto the ring 14. The wire terminals 27, 28 of the sensor unit 21 project axially, from the detection elements 22, 23, through the axial holes 64 in the radial wall 63.

The inner element 8 in this instance consists of a solid cylindrical part 67 comprising a cylindrical outer surface 67a and provided at its axial end opposite the radial wall 63 with a radial surface 68. Two threaded axial holes 69, 70 formed in the radial surface 68 allow the operating wheel 44 to be fixed onto the inner element 8, the central portion 48 of the operating wheel 44 being in contact with the radial surface 68 of the cylindrical axial portion of the inner element 8. The ring 15 is also push-fitted onto the outer surface 67a of the cylindrical axial portion 67.

A sealing and braking member has a first annular element 71 of L-shaped cross section comprising an axial portion 72 push-fitted onto the outer surface 67a of the cylindrical axial portion 67 and a radial portion 73 extends radially outward from the end of the axial portion opposite the rings 14 and 15. A second annular element 75 similar to the first annual element 71 comprises an axial portion push-fitted into the bore 2a of the tubular portion 2, a radial portion 76 extending radially inward from one end of the axial portion 74, on the same side of the ring 14. The radial portion 73 of the first annular element 71 fits near the axial portion 74 of the second annular element 75.

A support portion 77 extends from the smaller-diameter region of the radial portion 76 radially inward obliquely on the opposite side to the ring 14. A sealing gasket 78 overmolded onto the smaller-diameter region of the support portion 77 comprises a lip 79 having a V-shaped half section in contact with an outer surface 72a of the axial portion 72 of the first element 71 and also in contact with a radial surface 73a of the radial portion 73 of the first element 71 oriented on the same side as the ring 14. The lip 79 is kept in contact with the axial portion 72 by means of a spring ring 80 introduced into the opening of the V-shaped section of the lip 79 so that said contact between the lip 79 and the outer surface of the axial portion 72 creates a rubbing torque which opposes the turning of the operating wheel 44. The gasket performs a sealing function and a braking function. In addition, sealing by means of narrow passage is afforded between the radial wall 73 of the first element 71 and the axial wall 74 of the second element 75, the radial wall sitting radially in close proximity to the axial wall 74.

The braked antifriction bearing is of small axial bulk. The annular surface 2b extending in a radial plane and provided with threaded holes 65 able to collaborate with the support wall 51 allows the braked antifriction bearing to be arranged axially on a first side of the support wall 51 while at the same time offering up and fixing the operating wheel 44 axially on the opposite side of the support wall 51 to the braked antifriction bearing.

Since the means of fixing the non-rotating outer element, which are the holes 65, lies at a distance from the axis 6 of rotation of the inner element 8 that exceeds the distance between the rolling elements 12 and the axis of rotation, they do not impede access to the axis of rotation of the rotating part for securing the wheel.

Figure 5:
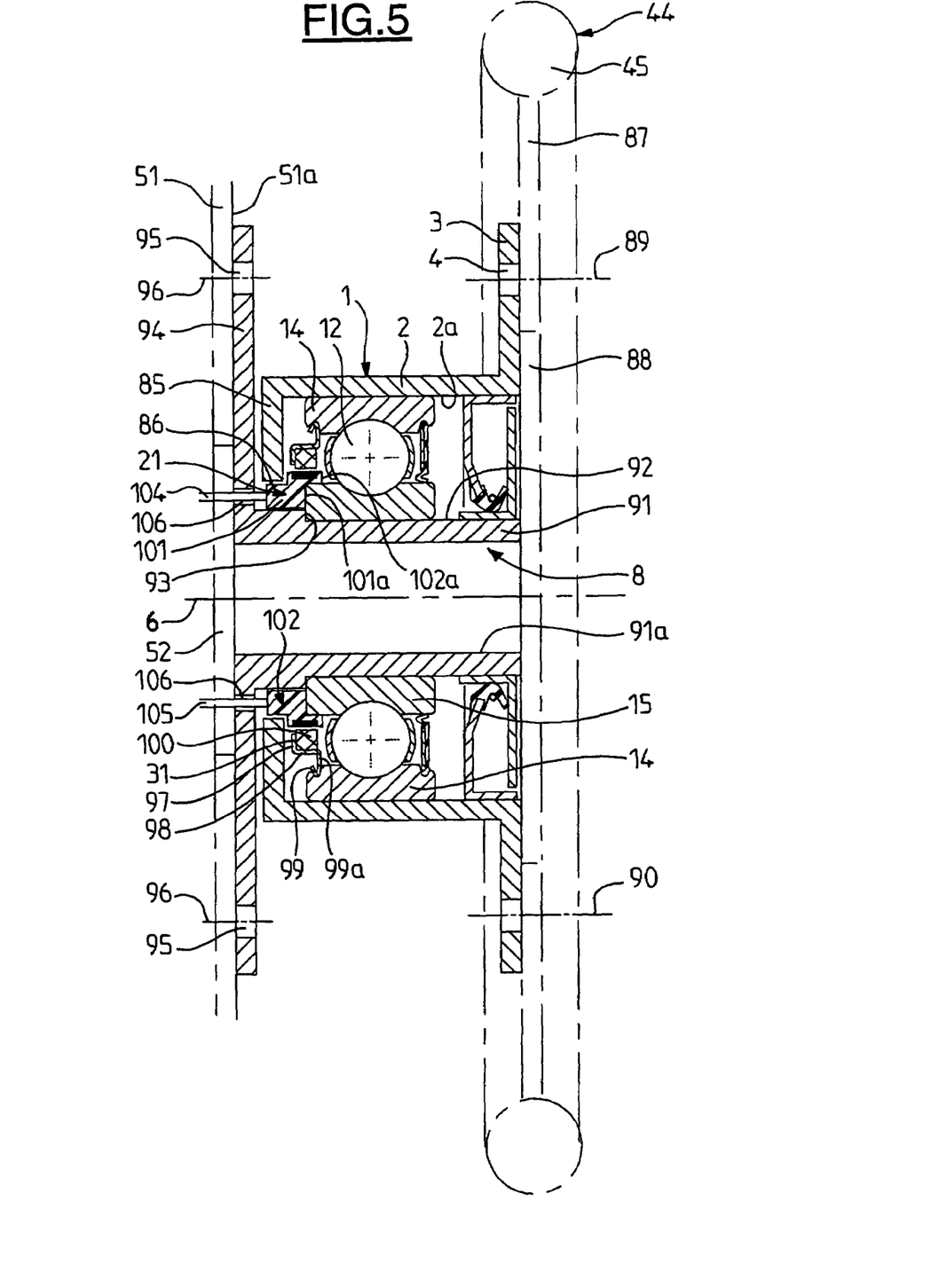
FIG. 5 is a view in axial section of a fourth embodiment of the bearing device.

FIG. 5 illustrates an embodiment in which the inner part is the non-rotating part, the outer part being the rotating part. The outer element 1 has a tubular portion 2 and a radial portion 3 provided with a number of holes 4. A radial portion 85 extends radially inward from the end of the axial portion 2 opposite the radial portion 3, leaving a central hole 86 free. The operating wheel 44 comprises a toric member 45 for holding and a radial part 87 the larger-diameter region of which supports the member 45 for holding, extending in a radial plane while leaving a hole 88 coaxial with the outer element, the smaller-diameter region of the radial portion 87 lying axially facing the holes 4 of the radial portion 3 of the outer element 1.

Fixing and drive members 89 and 90, for example a screw or a screw-nut system embodied by an axis to make the drawing clearer, allow the operating wheel 44 to be fixed to the radial wall 3 of the outer element 1. The inner element 8 has a tubular portion 91 an axial end of which lies in the radial plane of the radial wall 3 of the outer element 1, the tubular portion 91 extending axially on the same side of the radial portion 85 of the outer element 1, beyond the radial portion 85 of the outer element 1. The axial portion 91 comprises on its outer surface a bearing surface 92, on the same side as the radial portion 3 of the outer element 1, stretching axially in proximity to the radial portion 85 of the outer element 1 and forming a radial shoulder 93. The ring 15 is push-fitted onto the bearing surface 92 of the axial portion 91, and rests axially against the radial shoulder 93. On the axially opposite side to the bearing surface 92, the inner element 8 comprises a radial support portion 94 stretching radially outward from the opposite axial end of the axial portion 91 to the bearing surface 92. The axial support portion 94 comprises orifices 95 more or less facing the holes 4. The radial support plate 94 rests against a surface 51a of a radial support wall 51. Fasteners 96, for example a screw or screw-nut system, allow the inner element 8 to be secured to the support wall 51, collaborating with the orifices 95 of the radial support wall 94.

The ring 14 is push-fitted into the bore 2a of the axial portion 2 of the outer element 1. The ring 14 in this instance is associated with the outer element 1 which is the rotating element. The encoder ring 31 is secured to the ring 14 and comprises a sheet metal support formed by a radial portion 97 and an axial portion extending from the larger-diameter region of the radial portion 97 axially toward the rolling elements 12, a radial portion 99 extending radially in a plane lying radially facing the groove 19, radially outward from the end of the axial portion 98 opposite to the radial portion 97. The radial portion 99 has a free end 99a which is curved and becomes lodged in the annular groove 19 of the ring 14 to fix the encoder ring 31 onto the ring 14. The active part 100 is secured to the inner wall of the axial portion 98.

The sensor unit 21 comprises an axial portion 101 having a radial end surface 101a butting axially against a frontal surface of the ring 15. A radial portion 102 stretches radially outward, from the end of the axial portion 101 adjacent to the ring 15. An axial portion 102a stretching from the larger-diameter region of the radial portion 102 is push-fitted onto the outer surface of the ring 15. The sensor unit 21 further comprises two wire terminals 104 and 105 associated respectively with the detection elements 22 and 23 and projecting axially from the axial portion 101 of the sensor unit 21 and passing through holes 106 made in the radial support portion 94 of the inner element 8.

The hole 88 in the operating wheel 44 and the bore 91a in the tubular portion 91 may possibly be used to house and secure an operating indicator or monitor, such as a speed indicator, or a warning signal.

The operating wheel has a part for holding and a radial part 87, which means that the wheel 44 is flat, making it easier to store and transport.

Figure 6:
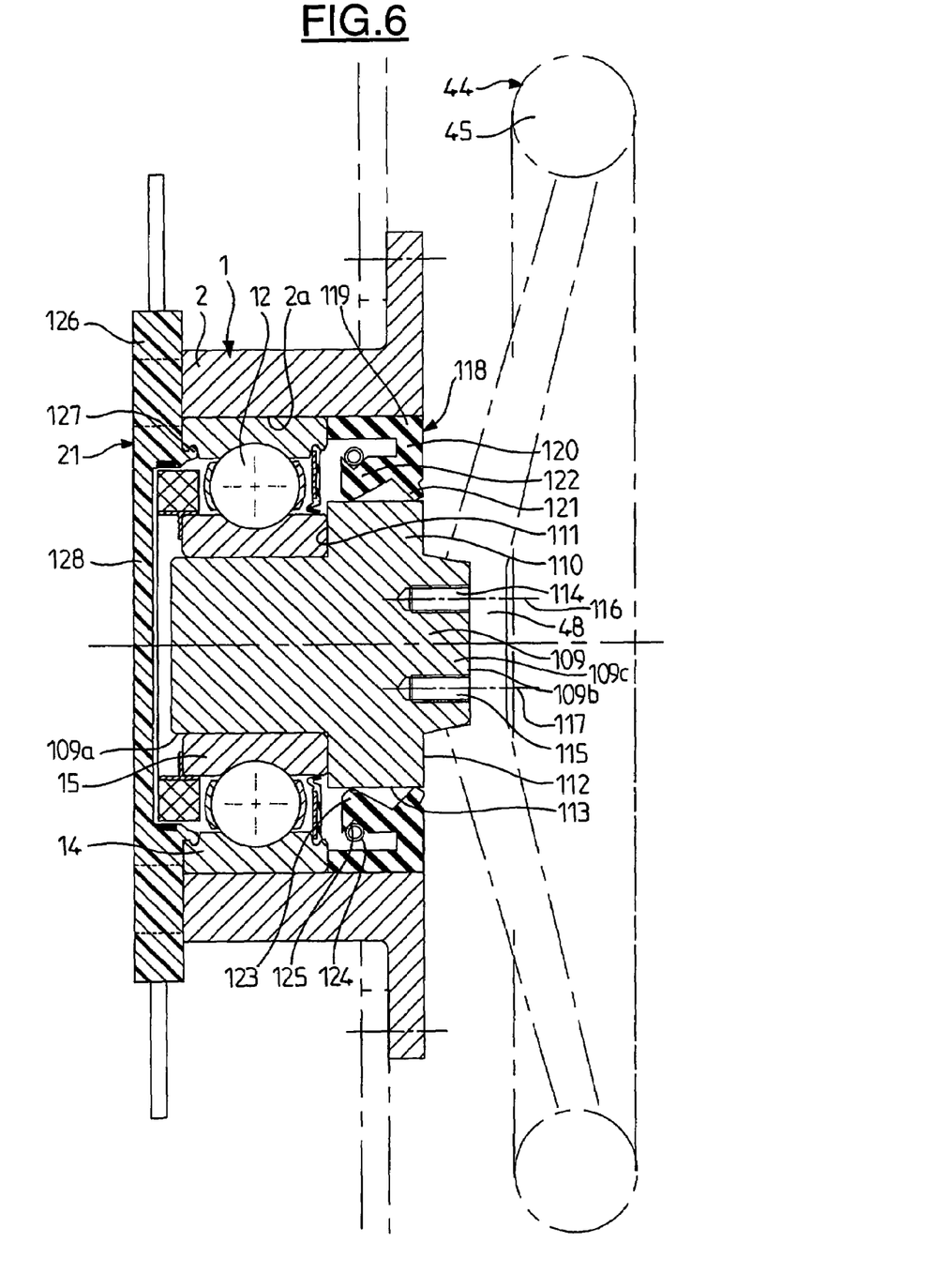
FIG. 6 is a view in axial section of a fifth embodiment of the bearing device.

FIG. 6 introduces an embodiment in which the rotating inner element 8 is in the form of a solid piece of revolution 109 having, on the opposite side to the operating wheel 44, an outer surface 109a onto which the ring 15 is push-fitted. The inner element 8 comprises an annular flange 110 of rectangular cross section forming a shoulder 111 oriented toward the ring 15 and against which the ring 15 axially bears. On the opposite side to the shoulder 111, the annular flange 110 has a radial surface 112 lying in the plane of the radial end surface of the radial portion 3 of the outer element 1. The annular flange 110 further comprises a cylindrical outer surface 113 facing the bore 2a of the axial portion 2 of the outer element 1. The annular flange 110 extends radially beyond the outer ring 15. On the opposite side of the annular flange 110 to the ring 15, the inner element 8 comprises a frustoconical fixing portion 109c projecting axially from the annular flange 110 and provided at its end with a radial surface 109b.

Two threaded holes 114, 115 formed axially in the radial surface 109b of the fixing portion 109c are designed to collaborate with fasteners 116, 117 for fixing the radial portion 48 of the operating wheel 44.

A gasket 118, arranged between the axial portion 2 of the outer element 1 and the annular flange 110 of the inner element 8, comprises an axial portion 119 butting against a frontal wall of the ring 14. The axial portion 119 stretches axially as far as the plane of the end surface of the radial portion 3 of the outer element 1. The gasket 118 comprises a radial portion 120 stretching radially inward from the opposite end of the axial portion 119 to the ring 14 toward the annular flange 110, extended radially via a lip 121 coming into frictional contact with the cylindrical outer surface 113 of the annular flange 110.

The gasket 118 has a second axial portion 122 stretching axially toward the ring 14 from the smaller-diameter region of the radial portion 120 and having, at its end axially opposite to the lip 121, a second lip 123 in frictional contact with the cylindrical outer surface 113 of the annular flange 110. The lip 123 is kept in contact with the cylindrical outer surface 113 of the annular flange 110 by means of a spring ring 124 situated more or less in the same radial plane as the lip 123 in an annular groove 125 of V-shaped cross section made in the outer surface of the axial portion 112. The gasket 118 is push-fitted into the bore 2a of the axial portion of the outer element 1 so that it rotates as one with the outer element 1. The gasket 118 has two lips 121, 123 in frictional contact with the cylindrical outer surface 113 of the annular flange 110 and allows the antifriction bearing to be sealed against an external environment while at the same time creating a frictional force which opposes the turning of the inner element 8 as brought about by the operator.

The sensor unit 21 comprises an annular portion 126 resting axially against the end of the axial portion of the outer element 1 opposite to the radial wall 3, and against an adjacent frontal wall of the ring 14. An annular bulge 127 projects into the annular rib 19 of the ring 14 and fixes the sensor unit 21 to the ring 14. The sensor unit 21 comprises a radial wall 128 forming a cap stretching radially inward from the end of the annular portion 126 so as to close the sensor unit 21 off axially.

The braked antifriction bearing can be obtained from a small number of parts and its cost of manufacture can be reduced. The means of fixing the non-rotating outer element 1 which are arranged on the radial wall 3 are situated a distance away from the axis of rotation of the rotating inner element that exceeds the distance between the rolling elements and said axis of rotation. The outer element does not impede access to the axis of rotation for fixing the wheel.

In general, the antifriction bearing is of small axial bulk and is obtained from a limited number of parts. The braked antifriction bearing can therefore be obtained at low cost.

The use of a radial wall directed outward for fixing the non-rotating part of the device onto a support makes it possible to get said device to seat well onto said support while at the same time, when the flange is situated on the same side as the wheel, having the option of incorporating the instrumented bearing device into the support.

In general, the braked antifriction bearing having fixing means arranged on the rotating part and fixing means arranged on the non-rotating part can easily be incorporated into a mechanical subassembly comprising a system for transmitting electrical commands from a control wheel. All that is required is for a few screws to be used to fix the instrumented bearing device onto a support structure, said device then being ready to take a control wheel the choice of the shape and external dimensions of which is the province of the user.

What is claimed is:

1. An instrumented antifriction bearing device for a control wheel, comprising:
   an antifriction bearing comprised of:
      an outer part;
      an inner part;
      one of said parts rotating and the other of said parts non-rotating; and
      a row of rolling elements arranged between said rotating and nonrotating parts;
   detecting means for detecting rotating parameters;
   braking means arranged in an axial continuation of the antifriction bearing;
   the non-rotating part being designed for fixing the device to a support, and comprising a radial surface provided with securing means for securement to the support; and
   the rotating part including axial ends and being provided at one of its axial ends with attachment means for fixing and angularly connecting said rotating part to an operating wheel.

2. The device according to claim 1, wherein the attachment means are formed from an approximately radial surface of the rotating part.

3. The device according to claim 1, wherein the securing means are arranged radially a distance away from the axis of rotation of the rotating part that is greater than or approximately equal to the distance between the attachment means of the radial surface of the rotating part and the axis.

4. The device according to claim 1, wherein the rotating part comprises an axial portion provided with a radial surface having at least one fixing hole.

5. The device according to claim 1, wherein the rotating part comprises a tubular portion and a radial portion extending radially inward from one end of the tubular portion, the radial portion being provided with at least one fixing hole.

6. The device according to claim 1, wherein the rotating part comprises a tubular portion and a radial portion extending radially outward from one end of the tubular portion, the radial portion being provided with at least one fixing hole.

7. The device according to claim 1, wherein the non-rotating part comprises a tubular portion and a radial portion extending radially outward from one end of the tubular portion, the radial portion being provided with at least one fixing hole.

8. The device according to claim 7, wherein the rotating part comprises an axial portion provided with a radial surface, and the radial portion of the non-rotating part is situated more or less in the same radial plane as the radial surface of the rotating part.

9. The device according to claim 1, wherein the non-rotating part comprises an open central hole allowing the passage of a shaft.

10. The device according to claim 1, wherein the rotating and non-rotating part each comprises a raceway between which the rolling elements are arranged.

11. The device according to claim 1, further comprising two rings one secured to the rotating part and the other secured to the non-rotating part, and between which the rolling elements are arranged.

12. The device according to claim 1, wherein the braking means comprise a plurality of disks held in frictional contact by at least one axially elastic element.

13. The device according to claim 1, wherein the braking means comprise a gasket in frictional contact with a cylindrical surface of the rotating part.

* * * * *